US006821541B2

(12) United States Patent
Lee

(10) Patent No.: US 6,821,541 B2
(45) Date of Patent: Nov. 23, 2004

(54) ANAEROBIC TEA STEEPER AND METHOD OF USE

(76) Inventor: Sin Hang Lee, 53 Milan Rd., Woodbridge, CT (US) 06525

( * ) Notice: Subject to any disclaimer, the term of this patent is extended or adjusted under 35 U.S.C. 154(b) by 56 days.

(21) Appl. No.: 10/161,325

(22) Filed: Jun. 3, 2002

(65) Prior Publication Data

US 2003/0221563 A1 Dec. 4, 2003

(51) Int. Cl.[7] ............................... A23F 3/34; A23F 3/36
(52) U.S. Cl. ....................................... 426/435; 426/433
(58) Field of Search ......................... 99/322, 317, 318, 99/319, 320, 321, 323, 304, 306; 426/433, 435

(56) References Cited

U.S. PATENT DOCUMENTS

| | | | | |
|---|---|---|---|---|
| 673,371 | A | * 4/1901 | Thorp | 99/304 |
| 1,596,415 | A | * 8/1926 | Enright | 99/285 |
| 1,722,696 | A | * 7/1929 | Fowler | 99/322 |
| 1,777,909 | A | * 10/1930 | Brookes | 99/322 |
| 2,835,188 | A | * 5/1958 | Graham | 99/299 |
| 3,063,359 | A | * 11/1962 | Brant | 99/287 |
| 4,309,940 | A | * 1/1982 | Lowerre, Jr. | 99/281 |
| 4,526,796 | A | 7/1985 | Ashikawa | 426/465 |
| D313,144 | S | 12/1990 | Stutzer | D7/309 |
| 5,453,189 | A | 9/1995 | Joergensen | 210/238 |
| 5,478,586 | A | 12/1995 | Connor | 436/431 |
| 5,687,637 | A | 11/1997 | Brookshire et al. | 99/295 |
| D388,274 | S | 12/1997 | Wang | D7/317 |
| 6,152,018 | A | 11/2000 | Yeh | 99/279 |
| D444,337 | S | 7/2001 | Ryan et al. | D7/317 |
| 6,264,995 | B1 | 7/2001 | Newmark et al. | 424/725 |
| D448,235 | S | 9/2001 | Jorgensen | D7/319 |
| 6,299,925 | B1 | 10/2001 | Xiong et al. | 426/597 |
| D450,522 | S | 11/2001 | Chen | D7/319 |
| 6,324,967 | B1 | 12/2001 | Robinson | 99/297 |

OTHER PUBLICATIONS (Abstract printout from www.ncbi.mim.nih.gov) Proniuk et al., "Preformulation study of epigallocatechin gallate, a promising skin cancer prevention," J Pharm Sci 2002 Jan.; 91(1):111–6.
(Abstract printout from www.ncbi.mim.nih.gov) Chen et al., "Degradation of green tea catechins in tea drinks," J Agic Food Chem 2001 Jan.; 49(1):477–82.
Hasan Mukhtar et al., "Tea polyphenols: prevention of cancer and optimizing health", Am J Clin Netr 2000:71(suple):1698S–1702S,2000.
Bertolini et al., "Inhibition of angiogenesis and induction of endothelial and tumor cell apoptosis by gree ntea in animal models of human high–grade non–Hodgkin's lymphoma", Leukemia (2000) 14, 1477–1482, 2000.
Nakayama et al., "Inhibition and influenza virus infection by tea", Letters in Applied Microbiology, 1990, 11:38–40.
Mukoyama et al., "Inhibition of rotavirus and enterovirus infections by tea extracts", Jpn J Med Sci Biol, 44, 181–186 (1991).

(List continued on next page.)

Primary Examiner—Reginald L. Alexander
(74) Attorney, Agent, or Firm—Nash and Titus, LLC

(57) ABSTRACT

This invention introduces a container in the form of a mug with a lid or in the form of an enclosed vessel of any size and shape for tea steeping wherein the dried tea leaves are extracted with hot water neither in contact with oxygen in the free air nor in contact with oxygen in a pocket of free air in order to maximize the preservation of the antioxidants in the aqueous tea extract to be used as a health-promoting beverage. In accordance with a special aspect of the invention, a standard method of using the novel anaerobic tea mug for preparation of tea extract to be consumed in humans and in dogs for the purpose of disease prevention is described.

20 Claims, 1 Drawing Sheet

OTHER PUBLICATIONS

Brown, Michael, "Green tea (Camellia Sinensis) Extract and its possible role in the prevention of cancer", Alternative Medicine Review, vol. 4, No. 5, pp. 360–370, 1999.

Ohe et al., "Catechins are not major components responsible for anti–genotoxic effects of tea extracts against nitroarenes", Mutation Research, 496 (2001) 75–81.

Astill et al., "Factors affecting the caffeine and polyphenol contents of black and green tea infusions", J. Agric. Food Chem., 2001, 49, pp. 5340–5347.

Kumamtoto et al., "Effects of pH and metal ions on antioxidative activities of catechins", Biochi. Biotechnol. Biochem., 65(1), 126–132, 2001.

Sakata et al., "Quantitative analysis of (–) epigallocatechin gallate in tea leaves by high–performance liquid chromatography." Yakugaku Zasshi, 111(12) 790–793 (1991).

Khokhar et al., "Total phenol, catechin, and caffeine contents of teas commonly consumed in the United Kingdom", J. Agric. Food Chem., 2002, 50, 565,570.

Chen et al., "Degradation of green tea catechins in tea drinks", J. Agric. Food Chem., 2001, 49, 477–482.

Proniuk et al., "Preformulation study of epigallocatechin gallate, a promising antioxidant for topical skin cancer prevention", J. Pharmaceutical Sciences, vol. 91, No. 1, Jan. 2002, 111–116.

MItsher and Dolby. The Green Tea Book, China's Fountain of Youth, Chapter 11, "Ti's Tea Time!", pp. 141, 146, 147, Avery Publishing Group, 1998.

Fujiki et al., "Cancer inhibition by green tea", Mutation Research, 402 (1998) 307–310.

Fujiki, H., "Two stages of cancer prevention with green tea", J. Cancer Res Clin Oncol (1999) 125:589–597.

(Printout from www:worldconsortium.com/brewing.html) "The Act of Brewing and Drinking Green Tea", 4 pages.

(Printout from www:worldconsortium.com/brewing.html) "Traditional Chinese Brewing Method", 4 pages.

* cited by examiner

ANAEROBIC TEA STEEPER AND METHOD OF USE

FIELD OF THE INVENTION

The invention relates to container apparatuses and methods for steeping tea, especially green tea, in generally anaerobic conditions. Tea steeped in the ways and means described in conjunction with this invention can be rich in antioxidants.

BACKGROUND

Aqueous extract of the dried leaves of tea trees, *Camellia sinensis*, which is generally referred to as tea, has been used as a favorite beverage in certain societies for about 5,000 years for its soothing taste and for its potential health benefits to human beings. Only in the past few decades has scientific data clearly demonstrated a positive relationship between regular tea drinking and the prevention of certain human diseases. Recently numerous medical and scientific reports have indicated that tea drinking may be associated with a wide range of health benefits, including lowering the total blood cholesterol and the low-density-lipid cholesterol level, increasing the high-density-lipid blood cholesterol level, reducing blood pressure, acting as blood thinner, reducing the risk of heart attack, decreasing the risk of stroke, reducing the risk of cancer, enhancing the immune system of the body and preventing dental cavities.

Results from studies in rats, mice and hamsters showed that tea consumption protects against lung, forestomach, esophasus, duodenum, pancreas, liver, breast, colon, and skin cancers induced by chemical carcinogens. Regular consumption of green tea has a preventive effect against atherosclerosis, hypercholesterolemia, and hypertension (Hasan Mukhtar and Hihal Ahmad, Am J Nutr 71:1698S–1702S, 2000). The growth of certain types of high-grade human non-Hodgkin's lymphoma cells can be inhibited by green tea extracts in animal models. Green tea extracts were found to be more effective than the chemotherapeutic drug cyclophosphamide in preventing lymphoma recurrence (Bertolini F et al. Leukemia 14: 1477–1482, 2000). Tea extracts also appear to have antiviral effects by interference with virus adsorption to target cells (Nakayama M et al. Letters in Applied Microbiology 11:38–40, 1990; Mykoyama A et al. Japan J Med Sci Biol.44: 181–186, 1991).

The published research data indicated that the health-promoting active ingredients in the tea leaves belong to a family of chemicals, functionally referred to as "antioxidants" which also exist in many plant foods loosely labeled as "flavonoids". Most researchers have identified the health-beneficial antioxidants in tea leaves to be polyphenols, known in chemical terms as (−) epigallocatechin gallate (EGCG), (−) epigallocatechin (EGC), (−) epicatechin gallate (ECG), and (−) epicatechin (EC) (referred hereafter generally as catechins). These active polyphenolic compounds may account for 30–40% of the extractable solids of green tea leaves (Brown Md., Altem Med Rev. 4:360–370, 1999) although it is possible that other important ingredients of tea beneficial to human health are as yet to be identified (Ohe T. et al. Mutat. Res. 496:75–81, 2001).

One of the most important discoveries in medical research of recent years is the finding of the toxic effects of the so-called free radicals in human body. Free radicals, which are often reactive oxygen species, are highly reactive molecules that can damage the cells of the human body and contribute to many diseases and to the aging process. A free radical takes an electron from another molecule, turning the latter molecule into an electron-deficient free radical that will rob an electron from yet another molecule. In such a chain reaction, some of normal cellular structures reacting with the free radicals may be damaged. These damages may be apparent immediately or may be latent.

The harmful effects of free radicals on the human cells include causing oxidation of the fats and proteins of the cell membranes, damaging the mitochondria, interference with normal cellular functions by inactivating enzymes and hormones and damaging the DNA code leading to irreversible mutation and development of cancer.

Free radicals are being created constantly in the human body as part of the normal living process, or can be introduced from the environment in the form of nitrogen dioxide and other potentially harmful chemicals in the air pollutants, toxic wastes and pesticides. Ultraviolet radiation from the sun, cigarette smoking (active or passive), various medications, etc. all introduce free radicals into the human body. Therefore, there is no way to avoid free radicals completely in life. However, some nutrient supplements are known to help the body to minimize the harmful effects of free radicals. For example, the flavonoids can prevent the formation of free radicals, and protect vitamin C which can neutralize free radicals in the extracellular and intracellular fluids. Vitamin E can protect the cell membranes from the oxidation damage induced by free radicals. The carotenoids can scavenge singlet oxygen molecules and prevent the oxidation of fats which are essential components of cell membranes.

The tea polyphenols as antioxidants in the flavonoid family are capable of preventing the formation of free radicals or interrupting the chain reaction of free radical formation by donating their loosely attached electrons to the free radicals, making the latter inactive and harmless without becoming free radicals themselves. Therefore, tea polyphenols are ready electron donors and their antioxidant function must be maintained or preserved in the dried tea leaves and in the tea extracts for the latter to be effective as a health-promoting herbal beverage.

Exposure to oxygen may reduce the contents of tea polyphenols. For example, the process of fermentation which is actually an oxidation treatment of the tea leaves for 60 to 120 minutes in preparing black tea has been shown to cause more than 80% degradation of the tea catechins in the tea leaves with no decrease in caffeine contents (Astill C et al. J. Agric. Food Chem. 49:5340–5347, 2001). Therefore, most medical and scientific data have been based on studies using the unfermented green tea extracts as the active substance.

The antioxidant activities of tea catechins, especially EGCG, the most abundant and most active catechin in tea extracts, are influenced by the pH and metal ions in the aqueous extracts remaining high and constant at pH 6–12, but decreasing in acidic and strong alkaline solutions. While copper ions increase the antioxidant activity of EGCG, ferrous ions inhibit the activity (Kumamoto M et al. Biosci. Biotechnol. Biochem. 65:126–132, 2001).

The EGCG contents in the dried tea leaves vary greatly not only with the types of dried tea leaves processed with different methods, but are also known to vary between leaves plucked from different parts of the same tea tree. The first young leaf has been shown to have the highest concentration of EGCG, and the concentration of EGCG decreases with aging of the leaf (Sakata I et al. Yakugaku Zasshi 111:790–793, 1991).

Khokhar and Magnusdottir (Khokhar S. and Magnusdottir S. G. M. J. Agric. Food Chem. 50:565–570, 2002) studied the efficiency of aqueous extraction of tea catechins from dried tea leaves. The results showed that a high temperature of 100° C. for 5 minutes is necessary for the most efficient extraction of tea catechins. At a lower temperature, for example, at 80° C., the extraction efficiency for EGCG is reduced by more than one third (⅓).

Degradation of the green tea catechins in tea drinks has also been studied (Chen Z. et al. J. Agric. Food Chem. 49:477–482, 2001). The results showed that the green tea catechins, namely (−) epigallocatechin gallate (EGCG), (−) epigallocatechin (EGC), (−) epicatechin gallate (ECG) and (−) epicatechin (EC) are generally stable at room temperature. However, at high temperature in the presence of oxygen, especially during autoclaving at 120° C. with addition of sucrose, citric acid, and ascorbic acid, unpredictable degradation of the tea catechins will take place. As a result, a person will ingest 400–500 mg of green tea catechins if one cup of tea drink is properly brewed in the "traditional manner". In contrast, a person will ingest only 3–60 mg of green tea catechins when one canned or bottled tea drink of 250 ml is consumed. Oxidation and epimerization of EGCG to (−) gallocatechin gallate during the heating process required for sterilization appear to be the mechanisms of green tea catechin degradation in the preparation of canned or bottled tea drinks. (Epimers are stereoisomers of a sugar or sugar derivative that differ in the arrangement of the hydrogen atom and the hydroxyl group on the last asymmetric carbon of a chain. The process of going from one epimer to another is called epimerization. Epimerization can occur as the result of a physical treatment, like heating, or an enzymatic activity.) In aqueous solutions, EGCG has been shown to be stable at 4° C. for 24 hours at pH 3–9. However, it degraded to a level below 80% of the initial concentration in 24 hours at 50° C. and pH 5. This process of degradation was further accelerated when the pH was above 5 (Proniuk S. J. Pharmaceutical Sciences 91:111–116, 2002). At pH 9 and 50° C., all active catechins in the tea extracts had practically vanished in 24 hours, due to accelerated oxidation in the alkaline solution.

One report has suggested that the dose of polyphenols needed for effective health protection is at least 300 to 400 mg of polyphenols per day, usually taken in the form of a green tea extract that may be standardized up to 97% polyphenols, with up to 67% being EGCG (Mitscher, L. A. and Dolby, V., The Green Tea Book, Avery Publishing Group, 1998, p.141). This amount of tea catechins is usually present in one cup of tea drink if the latter is properly brewed in the "traditional manner", using high quality dried tea leaves. However, a daily consumption of three to ten (3–10) cups a day is necessary to achieve the maximum health benefits of tea drinking. It has been reported that cancer onset in patients who had consumed over 10 cups of green tea per day was 8.7 years later among females and 3.0 years later among males, compared with patients who had consumed under three cups per day (Fujiki, H. et al. Mutat. Res. 402:307–310, 1998). Patients with stage I and II breast cancer who consumed over five cups of green tea per day experienced a lower recurrence rate and longer disease-free period than those consuming less than four cups per day (Fujiki, H. et al. J. Cancer Res. Clin. Oncol. 125:589–597, 1999). These two series of clinical studies clearly indicate a dose-effect relationship between tea drinking and cancer prevention in humans.

The daily effective volume of this health-promoting herbal beverage to be consumed depends on the levels of polyphenols, namely the active tea catechins, in the final tea extract, which in turn vary as result of many factors, including where the tea plant was grown, the age of the tea leaves when plucked, how the tea leaves were processed, how the dried tea leaves were stored and how the tea extract was brewed. Even the traditional methods of tea brewing differ from location to location in countries with a long history of tea-drinking culture. Therefore, in order to maximize the benefits of drinking tea as a herbal beverage for health-promoting purpose, it is best to select young leaves from the tea trees grown in a reputable plantation (for example, to use organically grown tea and otherwise avoid the use of insecticides), to choose a drying process with the maximum preservation of the tea catechins, to store the dried tea leaves properly to avoid oxidation, and to brew the aqueous tea extracts under conditions with minimal catechin degradation for maximum preservation of its antioxidant activities. Since oxidation is the major mechanism of tea catechin degradation, the contents of molecular oxygen in a hot tea extract should be reduced to a minimal level during tea brewing.

The traditional methods of brewing tea involve significant exposure of the tea to atmospheric oxygen, and consequently do not avoid oxidation of the "antioxidants" during tea extraction. For example, one of the large tea companies in China, FML Tea Trading Co.,Ltd. has published on the Internet (Url:http://www.fmltea.com Address:Hongseng Building 21F1,Xiamen,China) the instructions to prepare tea as follows:

"Add ¾ teaspoon of dry tea to a clear tea glass or a porcelain cup. Bring fresh, cold water to a boil, keeping it boiling for about 5 seconds. Allow the temperature to fall to approximately 185 degrees (check with a thermometer, if possible; otherwise, wait about five minutes) and fill the cup with hot water. Steep for 2–3 minutes. Sip slowly and enjoy. When the tea water goes down to one-third of the glass or cup, add hot water again for a delicious second infusion. Or, prepare by the potful . . . the tea leaves may be steeped several times (at least three), depending on the quality grade of the tea. Take time to enjoy this delicious China green tea."

Another tea company, Xianju Green Tea published The Art of Brewing and Drinking Green Tea on the web site www.worldconsortium.com/brewing with following instructions for tea brewing:

1) Ceramic Cup

Simply put 3 grams (approximately one teaspoon) of loose Green Tea into a ceramic cup (6 ounces to 8 ounces) or inside the ceramic filter of the cup if there is one. Then pour freshly boiling water (for best results please use water at the temperature of 80 degrees Celsius or 170 degree Fahrenheit) into your ceramic cup. Put a cover on top of the cup, and let it sit for 3 minutes. When one third of the tea is all that is left in the cup, you can add more hot water. You can repeat the above procedure with the same loose Green Tea leaves up to three times or more.

(2) Ceramic Tea Pot

Preheat your teapot by rinsing it with hot water. Then add the loose tea leaves according to the size of your teapot (for example, 2 teaspoons for 6 teacups of boiling water). Next, pour the freshly boiling, distilled water (80 degrees Celsius or 170 degrees Fahrenheit) into your ceramic teapot. Cover the teapot for five minutes. You may repeat the process twice using the same tea leaves.

(3) Coffee maker

Treat the loose Green Tea as if it were ground coffee by putting it in a filter paper. Proper proportion is 1 teaspoon of tea leaves for three teacups of spring water. Follow the same procedure as you would if you were brewing coffee. Water boiled through the coffee maker has the same temperature required for brewing the Green Tea. You may repeat the same process twice.

(4) Iced Green Tea

You should never brew Green Tea with hot water and then cool it to prepare cold, or iced tea. Instead, please double the amount of the Green Tea leaves used to brew it in cold water in a sealed container. This way you keep the aroma, the natural color and the medicinal health benefits of the Green Tea. The reason this way is better, is that you avoid oxidation that can occur if the tea is left open to the air in an attempt to cool it after hot brewing. The brewing time is actually very short. For example, 10–15 cups of tea can be brewed in ajar in the ice box in just 30–45 minutes.

Mitscher, L. A. and Dolby, V.(The Green Tea Book, Avery Publishing Group, 1998, p.146–147) have summarized the present art of brewing tea in four illustrations:

1. Perforated stainless steel tea ball: Simply open the ball, put in a spoonful of tea, drop the ball into a cup of freshly boiled water, pop a lid on the cup, and let the tea steep.
2. Tea Mug: These are special tea mugs that may be fitted with a perforated infuser and have their own lids.
3. Perforated stainless steel spoon to hold the tea leaves in the hot water in a cup which cannot be covered by a lid properly.
4. Tea pot which may be equipped with an infuser. This is the time-tested method of brewing tea in a pot. The tea extract is poured into serving cups when ready.

Over the years, various versions of tea brewing devices have been patented (U.S. Pat. Des. 313,144; Des. 388,274; U.S. D 444,337; U.S. D 450,522; U.S. D 448,235S; U.S. Pat. Nos. 4,526,796; 5,453,189; 5,478,586; 5,687,637; 6,152,018 and 6,324,967 B1). These are all variations of the traditional tea pot, tea cup or tea mug described above without a provision to prevent degradation and oxidation of the tea catechins during tea brewing because in these containers the tea leaves are steeped in a hot aqueous solution in contact with molecular oxygen of the free air or with molecular oxygen in a pocket of free air.

SUMMARY OF THE INVENTION

The present invention introduces a container apparatus (such as a tea steeper) and methods for using same which entail immersion and extraction of tea leaves in a hot aqueous solution not in significant contact with molecular oxygen of the free air or with molecular oxygen in a pocket of free air for the maximum preservation of the active antioxidants in the tea extracts. The containers and methods of this invention are useful to prepare tea extracts as an herbal beverage for health-promoting purpose.

In particular, with this invention dried tea leaves are steeped in hot water while the aqueous solution is not in contact with molecular oxygen of the free air or with molecular oxygen in a pocket of free air. Under these anaerobic conditions, the tea catechins extracted, for instance (−) epigallocatechin gallate (EGCG), (−) epigallocatechin (EGC), (−) epicatechin gallate (ECG) and (−) epicatechin (EC), which are functionally strong antioxidants and ready donors of electrons to neutralize the toxic free radicals in the human body, will be optimally preserved during the brewing process.

For instance, in a first embodiment, the invention entails a container apparatus for steeping intact or fragments of dried tea leaves in water, comprising a container or chamber that has (a) closable opening (such as, for instance, a valve) and that is made of inert materials that can withstand contact with water having a temperature of at least 100° C. without releasing components or odors of the materials into the water. The container portion is formed in such a way that when the tea leaves and water are placed therein there is no significant contact between the water and atmospheric air and there is no significant amount of air trapped within the container in contact with the water. This embodiment may be useful for commercial tea brewing, and may include inlets for water and tea leaves, and outlets for air and the tea extract when it is finished brewing.

In another form, the container apparatus can comprise:

(a) a container which is made of inert materials that can withstand contact with water having a temperature of at least 100° C. without releasing components or odors of the materials into the water, and which has a top-opening for receiving a quantity of water, and (b) a lid sized to fit releasably on the top-opening of the container, which is made of inert materials that can withstand contact with water having a temperature of at least 100° C. without releasing components or odors of the materials into the water. When intact or fragments of dried tea leaves and water are placed into the container and the lid is placed on the top-opening of the container, the lid is adapted such that there is no significant contact between the water and atmospheric air and there is no significant amount of air trapped under the lid in contact with the water.

In a further embodiment, the invention contemplates methods of brewing intact or fragments of dried tea leaves under generally anaerobic conditions. Such methods minimally comprise the steps of:

(a) placing a quantity of intact or fragments of dried tea leaves into a container apparatus which comprises a container or chamber that includes a closable opening and that is made of inert materials that can withstand contact with water having a temperature of at least 100° C. without releasing components or odors of the materials into the water. The container is formed in such a way that when the tea leaves and water are placed therein there is no significant contact between the water and atmospheric air and there is no significant amount of air trapped within the container in contact with the water. That is, the container does not permit contact between the aqueous solution and the open-air, and no significant air pockets are trapped inside the container that come into contact with the aqueous solution.

(b) filling the container with water having a temperature of between about 70° C.–100° C.;

(c) allowing the tea leaves to be extracted in the water for at least about 10 minutes; and (d) optionally, pouring the liquid of step (c) onto ice and storing in an air-tight container in temperatures below about 37° C. for consumption within about 24 hours.

In a similar method, the steps include:

(a) placing a quantity of intact or fragments of dried tea leaves into a container apparatus that comprises a container which is made of inert materials that can withstand contact with water having a temperature of at least 100° C. without releasing components or odors of the materials into the water, and which has a top opening for receiving a quantity of water, and a lid sized to fit releasably on the top-opening of the container, which is made of inert materials that can withstand contact with water having a temperature of at least 100° C. without releasing components or odors of the materials into the water;

(b) filling the container with water having a temperature of between about 70° C.–100° C. so that the water level is at least at or near the top-opening (or even overflowing the top-opening) or up to a pre-marked position on the container;

(c) immediately placing the lid onto the top-opening of the container so that there is no significant contact between the water and atmospheric air and there is no significant amount of air trapped under the lid in contact with the water;

(d) allowing the tea leaves to be extracted in the water for at least about 10 minutes or until the water temperature cools to a safely drinkable temperature; and (e) optionally, pouring the liquid of step (d) onto ice and storing in an air-tight container in temperatures below about 37° C. for consumption within about 24 hours.

The conditions for these containers and methods of use are described as generally anaerobic. By this it is meant that the hot aqueous solution in the tea steeper is largely devoid of oxidizing gases, such as molecular oxygen and chlorine, which have been driven out of the water used to brewing the tea by boiling, and is prevented from reabsorbing molecular oxygen from the air during tea steeping. It is understood that the conditions of brewing and steeping the tea are not absolutely air-free, since most of the embodiments of the container apparatus will not have top openings that are hermetically sealed when brewing takes place (although hermetically sealed containers are contemplated as desired). While it is preferred that steeping of the tea take place in the complete absence of oxygen, it is understood that in practice this may be inconvenient or otherwise difficult to achieve for most users, and as demonstrated below in the examples the complete 100% absence of all oxygen during brewing is not essential to prepare a tea that is rich with antioxidants.

DETAILED DESCRIPTION OF THE PREFERRED EMBODIMENTS

In accordance with the container apparatuses and methods described herein, it is essential that the steeping of the tea leaves take place in the general absence of atmospheric oxygen. As noted above, under such generally anaerobic conditions, the tea catechins extracted, for instance (−) epigallocatechin gallate (EGCG), (−) epigallocatechin (EGC), (−) epicatechin gallate (ECG) and (−) epicatechin (EC), will be optimally preserved during the brewing process.

To that end, the container apparatus may be of any shape and size as long as the dried tea leaves are extracted in hot water that is not in contact with air or air pockets containing free oxygen (e.g., the steeping or brewing conditions are generally or completely anaerobic).

Figure 2:
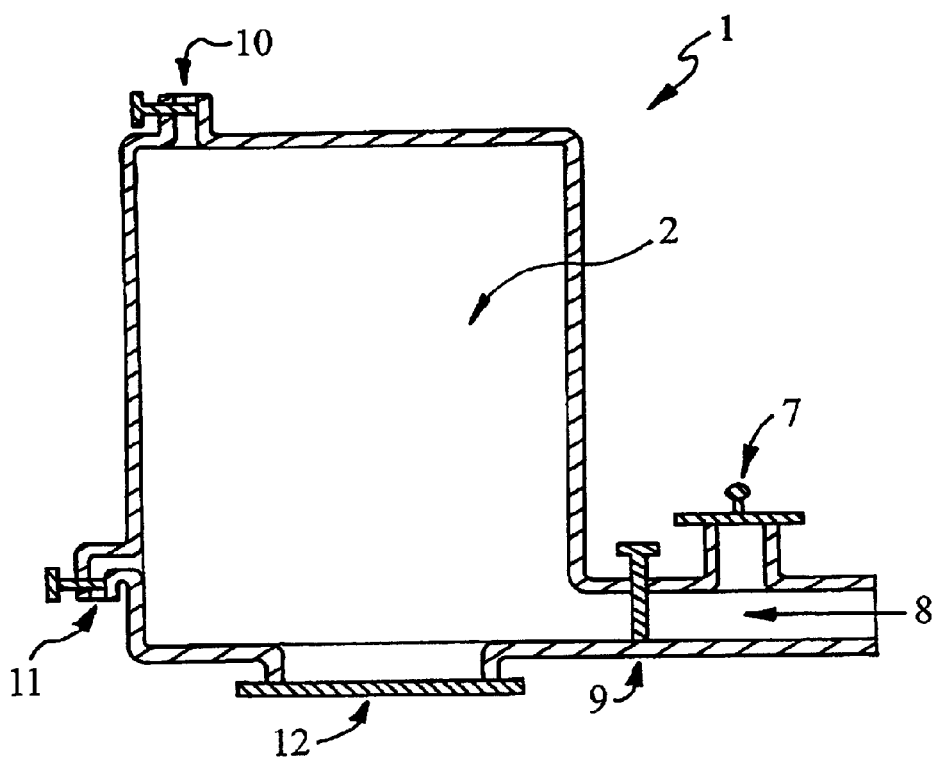
FIG. 2 shows a sectional view of another preferred embodiment of an anaerobic tea steeper including a container apparatus 1, a container 2, a dried tea inlet 7, a hot water inlet 8, a valve 9 for controlling entry of the hot water into the container 2, an air outlet with valve 10, a tea extract outlet 11, and a removable bottom plate 12 for cleaning.

In a first embodiment, the invention entails a container apparatus for steeping intact or fragments of dried tea leaves in water, comprising a container or chamber that has a closable opening (such as a valve) and that is made of inert materials that can withstand contact with water having a temperature of at least 100° C. without releasing components or odors of the materials into the water. The container may be of any size as long as it is formed in such a way that when the tea leaves and water are placed therein there is no significant contact between the water and atmospheric air and there is no significant amount of air trapped within the container in contact with the water. Controllable inlets (controlled, for instance by valves) may be provided for placing tea leaves and water into the container. Optionally, the same inlet may be used for placing the tea leaves and water into the container. Optionally, the closable opening on the container and a controllable inlet for water and/or tea leaves may be the same feature on the container. Optionally, the container apparatus may be provided with a way to determine that the desired quantity of water and/or tea leaves have been placed into the container portion. Further, a controllable outlet (such as a valve) may be provided for any air that is present within the container chamber to be released. A controllable outlet (such as a valve) for releasing the tea extract when the tea is done steeping can also be provided. Optionally, the container may include a second closable opening to allow periodic cleaning of the inside of the container. This embodiment may or may not include a lid for covering the opening of the apparatus. For instance, see FIG. 2 for an example of a commercial scale anaerobic tea steeper apparatus.

Figure 1:
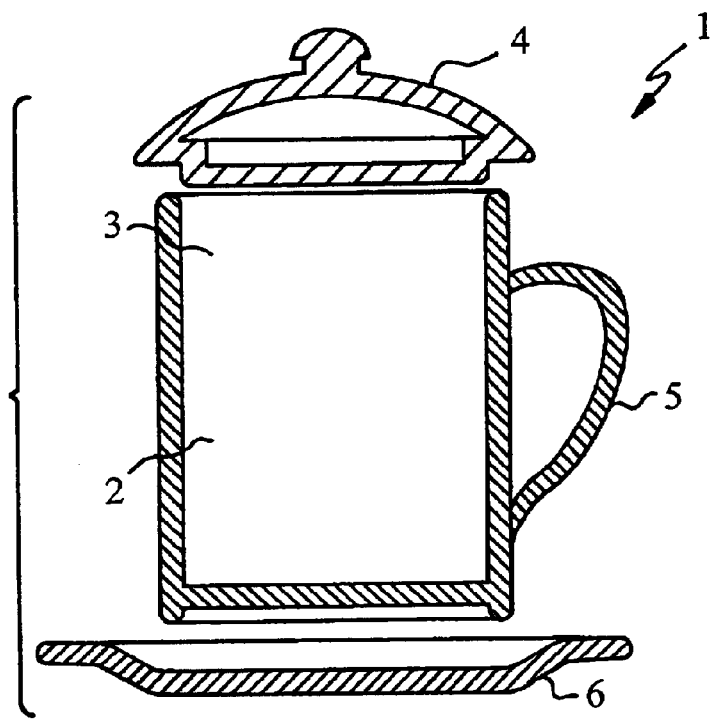
FIG. 1 shows a sectional view of one preferred embodiment of an anaerobic tea steeper including a container apparatus 1, a container 2, a top opening 3, a lid 4, a handle 5, and a dish 6. As shown in this embodiment, the bottom of lid 4 protrudes down into the top opening 3.

In one preferred embodiment, the container is conveniently constructed as a tea mug and a fitted lid, both made in such a fashion that the lid has a downward protruding bottom so that when lid is fitted snugly onto the top-opening of the mug, the bottom of the lid will sink into and below the surface level of the water so that there will be no free air trapped between the aqueous surface and the bottom of the lid in contact with the water. In this way, a generally anaerobic environment is formed within the container, and the tea is steeped in the general absence of oxygen. To ensure as complete as possible the displacement of atmospheric air from the interface between the aqueous solution and the lid when the lid is first placed on the mug, it is preferred that a certain amount of aqueous solution must be forced to overflow out of the opening of the container. Since the aqueous solution is at a near boiling temperature of 100° C. when first poured into the container for the most effective tea extraction, the overflowing liquid is capable of causing serious burns if in contact with the human skin. Therefore, a dish under the mug for containment of the overflowing hot water should be provided for safety reasons. An example of this anaerobic tea mug equipped with a fitted lid and an overflow dish is illustrated in FIG. 1.

To that end, it is preferred that the container apparatus further include a dish or other similar device as an accessory for the container to stand on in order to catch any overflowing hot water at boiling temperature when the lid is initially placed on the container filled with hot water (for instance, if water it filled to the rim or otherwise displaced over the top-opening when the lid is placed thereon). Obviously the dish should have a diameter greater than the outer diameter of the container.

It is also preferred that the container apparatus, including any lid or dish, are made of metals, heat-resistant plastics, ceramic, porcelain, glass, or mixtures thereof, which do not release metal ions, hydrogen ions, hydroxyl groups, anions, and organic substances to the aqueous tea extract at boiling temperature (e.g., at temperatures ranging from 70° C. to 100° C.).

Preferably, the container apparatus is about 10 cm in height and about 8 cm in inner diameter, and the lid when present is about 8.5 cm in its outer diameter. In a preferred variation of the lid, there is a discoid downward protruding bottom of about 7.5 cm in diameter.

Preferably the container has a handle for the user to grip.

Preferably the container has spout to facilitate pouring of tea steeped therein.

The tea leaves used in this invention are preferably dried. To ensure the best results, the tea leaves must be dried quickly after plucking to prevent degradation. In the examples given herein, the type of tea used is green tea. While green tea is preferred, other teas may be used effectively in the containers and processes of this invention. For instance, all types of teas, including oolong (partially fermented) and black tea (fully fermented) although the catechins in these teas are markedly reduced.

When practicing methods or using containers of the invention, it is preferred to use high quality, properly stored dried young tea leaves not previously subjected to processes of fermentation or oxidation, and vacuum-packed in aluminum foil. It is best that the tea be loose, rather than in a tea bag, because the process of manufacturing and the method of storage of tea bags may introduce a variety of uncontrollable factors, which may not be consistent with optimum preservation of the antioxidants in the tea leaves. In addition, for best results the tea should not have been grown with exposure to pesticides, insecticides or other undesirable chemicals; organically grown tea is preferred.

As an example of a preferred method in the practice of the invention, between about 2–20 grams (preferably about 5 grams) of tea leaves can be placed in the container. The container is filled with water having a temperature about 70° C. and 100° C. (preferably at an initial boiling temperature close to 100° C.) to the desired level, and the conditions of steeping or brewing must be generally anaerobic. If a lid for the container is contemplated, the container is filled to the rim of the top-opening or to a pre-marked/pre-determined place (such as would mark where the water level minimally must be in order that there be no air pockets trapped in the container when the lid is placed on the top-opening). The lid should then be placed immediately onto the top-opening to minimize the time the brewing tea is in contact with air. If a dish is used, the water may be filled to overflowing of the container, so that the dish catches the overflowing water as the lid is placed on the top-opening. For best results, the tea should steep under generally anaerobic conditions for between 5–20 minutes (preferably about 10 minutes) at ambient temperature. During this period, the temperature of the hot tea extract will usually drop to about 50° C.–60° C., a temperature which is tolerable to most people who like to drink hot teas. Generally speaking, the tea has brewed for sufficient time when the temperature of the tea has cooled enough for comfortable drinking. Consumption should occur within one hour of extraction to obtain the greatest benefits of the antioxidants. Preferably, the tea extract is consumed within one hour directly from the container while the container is kept covered between sips to avoid excess exposure to atmospheric oxygen. However, if the tea is not consumed within one hour, it may be rapidly cooled (e.g., by pouring it onto crushed ice or ice cubes) to 37° C. or lower, (preferably to 4° C.) and stored at a temperature between about 2° C. and about 10° C. (preferably 4° C.) in a non-open-air container, for example in a bottle with limited free air space, and consumed within 24 hours for obtaining the maximum health benefits of the tea extracts. Concentrated aqueous green tea extracts when stored at 4° C. may become turbid in appearance, but appear to remain effective in providing health benefits (see below).

In the hands of people skilled in this field, this invention can be practiced in a variety of modifications. For example, an anaerobic vessel which may be of any size and shape, may be optionally equipped with a heating device, and may be optionally equipped with a filter for retaining the tea leaves being extracted in the vessel can be constructed and used in place of the anaerobic mug described above for tea extraction. After extraction for about 20 minutes, the aqueous tea extract is cooled rapidly to a temperature below 37 C., or preferable to 4 C. for storage after exposure to atmospheric oxygen if it is not consumed within one hour.

The purpose of this invention is to provide a standardized method of preparing tea beverage using a novel anaerobic steeper for tea brewing to maximize the health benefits of tea drinking. The examples of using this standardized method to prepare tea to be consumed as a health-promoting supplement are illustrated as follows.

EXAMPLES

Example 1

Tea Extract Prepared Anaerobically for Prevention of Upper Respiratory Viral Infection Three healthy actively employed adult human subjects who worked in an acute patient care facility with frequent daily close contact with acutely ill patients and numerous co-workers and who had had a past history of suffering at least two upper respiratory viral infections per year during the winter months from November to April in the preceding five years were selected for this study. The subjects were instructed to drink every day three mugs of green tea prepared in the following manner, one in the morning, one in the afternoon and one around supper-time.

The dried green tea leaves used to prepare the tea drink were made of young tea leaves without undergoing prior processes of fermentation or oxidation, packed in aluminum foil under vacuum, and supplied by a reputable dealer specialized in tea trading.

To prepare the tea extract, a heaping teaspoonful of dried green tea leaves weighing about five (5) grams was placed in an anaerobic mug as described above. The mug was filled with boiling hot water to the rim. After the lid cover was placed, the tea leaves in hot water were allowed to steep at ambient temperature for 20 minutes and consumed within about one hour.

After an observation period from November to the end of April the following year, none of these three tea drinking subjects suffered from a single episode of upper respiratory viral infection whereas over 90% of their fellow co-workers working in the same environment suffered at least one upper respiratory viral infection during this period.

Example 2

Tea Extract Prepared Anaerobically as a Supplement for Controlling Canine Lymphoma A 45 lbs. neutered male mixed black Labrador adopted as a homeless puppy at about 6 months old from the island of Sint Maarten, Netherlands Antilles was raised as a house pet in the Northeast of the United States. The dog had been in good health except for infestation with multiple parasites which were successfully eradicated after he was adopted as a puppy. Since then, the dog had been given regular periodic veterinary care and immunizations without exposure to other unusual environments except making three trips a year with the owner to the island of Sint Maarten. At the age of about 7 and half years old, the dog developed a canine lymphoma, presenting with anorexia and general lymphadenopathy over a period of four weeks without fever. The clinical symptoms did not respond to treatment with various antibiotics. The biggest of the palpable lymph nodes was located in the left popliteal fossa, about the size of an egg, hard on palpation, and fixed to surrounding tissues. The dog's general condition deteriorated rapidly to a point that he laid down on the floor all the time, no longer wanted to come into the house after he was let out, and refused food or water intakes. A fine needle aspiration of the biggest popliteal lymph node was performed for cytologic examination. A Wright's stain of the aspirate smear showed monotonous immature lymphocytes. A diagnosis of malignant lymphoma was made by two pathologists, one specializing in hematopathology. An excisional biopsy was deemed unnecessary and was not performed.

According to the accepted guidelines in veterinary medicine as published by the National Labrador Retriever Club (http://www.labbies.com/index.html#Purchasing), the relevant information on the prognosis and standard treatment for canine lymphoma (lymphosarcoma) is summarized as follows.

"Without therapy, dogs diagnosed with lymphoma succumb to the disease within 4–6 weeks following diagnosis. Combination chemotherapy which is a treatment regimen where the dog is administered two or more drugs on a particular schedule, is the standard therapy. This regimen uses a combination of 5 drugs (Vincristine, L-Asparaginase, Prednisone, Cyclophosphomide and Doxorubicin), administered over a nine week period. Use of Prednisone alone helps to improve quality of life, however, remissions are brief, lasting only about 30 days. Combining Cyclophosphamide with Prednisone may provide a slightly longer duration of remission (30–60 days). Treatment with Doxorubicin alone has produced remissions for up to 18–29 weeks."

It is generally known that Vincristine, L-Asparaginase, Cyclophosphomide and Doxorubicin are cytotoxic chemotherapeutic agents which are associated with numerous potentially serious complications when given to humans and animals. The use of these chemotherapeutic agents is usually detrimental to the quality of life both for the dogs and for the dog owners. Therefore, instead of giving the standard combination chemotherapy of prednisone and these cytotoxic agents, the dog was treated with 40 mg of prednisone daily for five days and long-term daily dose of 450–500 ml of green tea extract continuously without interruption. The tea extract was prepared in the following manner.

The dried green tea leaves used to prepare the tea drink were made of young tea leaves without undergoing prior processes of fermentation or oxidation, packed in aluminum foil under vacuum, and supplied by a reputable dealer specialized in tea trading.

To prepare the tea extract concentrate, three heaping teaspoonfuls of dried green tea leaves weighing about fifteen (15) grams were placed in an anaerobic mug as described above. The mug was filled with boiling hot water to the rim. After the lid cover was placed, the tea leaves in hot water were allowed to steep at ambient temperature for 20 minutes. The still hot aqueous tea extract was poured into 3–4 ice cubes to lower the tea temperature to below 37° C. immediately. The cooled tea extract was placed in a 500 ml plastic bottle with an air-tight cover, and stored in a 4° C. refrigerator. The cold tea extract concentrate was consumed by the dog within 24 hours in three equally divided portions, in the morning, at noon and in the evening.

The size of the left popliteal lymph node decreased quickly on the combination treatment of prednisone and green tea extract. Prednisone has an anti-inflammatory effect and causes depletion of lymphocytes, normal or malignant to certain extent, at least initially. It makes the patient feel good (euphoric) and improves the appetite of the patients. It seems to help many cancer patients temporarily to improve the quality of life. But, as is well known, it is not the cause of cure of any cancers. It is often used in combination of other chemotherapeutic drug(s).

On the fifth day of this combination treatment, the original egg-sized popliteal lymph node was reduced to pea-sized, and remained in pea-size throughout the observation period of five months at the time of this writing. Lymph nodes at other sites became hardly palpable.

About 10 days after the initial five days course of prednisone was discontinued, the dog became anorexic and developed trigeminal neuritis, presenting with jaw paralysis, inability to close the mouth, drooling and difficulty eating and drinking. In order to treat the neuritis and to maintain the dog's appetite, a periodic administration of 20 mg prednisone per day for a continuous five days each month was resumed in addition to the daily aqueous tea extract. The symptoms due to trigeminal neuritis gradually improved to the point that the dog was able to drink liquid and eat in about two weeks. After two months of treatment, the dog became interested in playing and running again. At the end of the first five months after initiation of the combination periodic prednisone and long-term daily tea treatment, the dog behaved like a healthy 7–8 years old Labrador, fond of chasing squirrels and running on the sandy beach again. There were no signs of recurrence of lymphadenopathy. Therefore, the remission period with this combination treatment was expected to be longer than five months.

The cause for canine lymphoma, like those of all malignant neoplasms in animals and in humans, is unknown and may be multi-factorial. The response of any malignant tumor to any systemic treatment is not always predictable or guaranteed. However, in this illustrative case of canine lymphoma, green tea extract prepared according to this invention has extended the remission induced by prednisone from about 30 days to at least 150 days, and probably longer. As cited in the Background section above, the growth of certain types of high-grade human lymphoma cells can be inhibited by green tea extracts in animal models. And green tea extracts were found to be more effective than the chemotherapeutic drug cyclophosphamide in preventing lymphoma recurrence (Bertolini F et al. Leukemia 14: 1477–1482, 2000). This invention has introduced a standardized method of preparing tea extract, as an example, to be used as a potentially effective non-toxic combination therapeutic agent for the treatment of canine lymphoma.

All references cited hereinabove are incorporated by reference in their entirety.

What is claimed is:

1. A method of brewing intact or fragments of dried tea under generally anaerobic conditions, comprising the steps of:

(a) placing a quantity of intact or fragments of dried tea into a container apparatus which comprises a container which has a closable opening and which is made of inert materials that can withstand contact with water having a temperature of at least 100° C. without releasing components or odors of the materials into the water, which container is formed in such a way that when the tea leaves and water are placed therein there is no significant contact between the water and atmospheric air and there is no significant amount of air trapped within the container in contact with the water;

(b) filling the container with water having a temperature of between about 70° C.–100° C.;

(c) allowing the tea leaves to be extracted in the water for at least about 10 minutes or until the water temperature cools to a safely drinkable temperature; and (d) optionally, pouring the liquid of step (c) onto ice and storing in an air-tight container in temperatures below about 37° C. for consumption within about 24 hours.

2. The method of claim 1, wherein the quantity of dried tea placed into the container apparatus is between about 2 to about 20 grams.

3. The method of claim 1, wherein the container is made of ceramic, porcelain, glass, metals, heat-resistant plastics, or mixtures thereof.

4. The method of claim 1 wherein the container apparatus further comprises a dish which has a diameter greater than the outer diameter of the container, which dish is adapted for the container to rest on and to catch any overflowing hot water from the container.

5. The method of claim 1, wherein the container has a handle.

6. The method of claim 1, wherein the container has spout to facilitate pouring of tea steeped within the container apparatus.

7. The method of claim 1, wherein the tea leaves contain green tea leaves.

8. A method of brewing intact or fragments of dried tea under generally anaerobic conditions, comprising the steps of:

(a) placing a quantity of intact or fragments of dried tea into a container apparatus which comprises a container which is made of inert materials that can withstand contact with water having a temperature of at least 10020 C. without releasing components or odors of the materials into the water, and which has a top opening for receiving a quantity of water, and a lid sized to fit releasably on the top-opening of the container, which is made of inert materials that can withstand contact with water having a temperature of at least 100° C. without releasing components or odors of the materials into the water;

(b) filling the container with water having a temperature of between about 70° C.–100° C.;

(c) immediately placing the lid onto the top-opening of the container so that there is no significant contact between the water and atmospheric air and there is no significant amount of air trapped under the lid in contact with the water;

d) allowing the tea leaves to be extracted in the water for at least about 10 minutes or until the water temperature cools to a safely drinkable temperature; and (e) optionally, pouring the liquid of step (d) onto ice and storing in an air-tight container in temperatures below about 37° C. for consumption within about 24 hours.

9. The method of claim 8, wherein the quantity of dried tea placed into the container apparatus is between about 2 to about 20 grams.

10. The method of claim 8, wherein in step (b) the container is filled with enough water so that in step (c) when the lid is placed onto the top-opening some of the water overflows out of the top-opening.

11. The method of claim 8, wherein the lid has a downward protruding bottom adapted to extend below the surface of the water.

12. The method of claim 8, wherein the container and lid are made of ceramic, porcelain, glass, metals, heat-resistant plastics, or mixtures thereof.

13. The method of claim 8 wherein the container is a ceramic or porcelain mug of about 10 cm in height and about 8 cm in inner diameter, and the lid is about 8.5 cm in its outer diameter with a discoid downward protruding bottom of about 7.5 cm in diameter.

14. The method of claim 8 wherein the container apparatus further comprises a dish which has a diameter greater than the outer diameter of the container, which dish is adapted for the container to rest on and to catch any overflowing hot water when the lid is placed on the top-opening of the container.

15. The method of claim 8, wherein the container has a handle.

16. The method of claim 8, wherein the container has spout to facilitate pouring of tea steeped within the container apparatus.

17. The method of claim 8, wherein the tea leaves contain green tea leaves.

18. A method of brewing intact or fragments of dried tea leaves under generally anaerobic conditions, comprising the steps of:

(a) placing a quantity of loose green tea leaves into a container apparatus which comprises a container which is made of ceramic, porcelain, glass, metals or heat-resistant plastics, which can withstand contact with water having a temperature of at least 100° C. without releasing components or odors of the materials into the water, which has a top opening for receiving a quantity of water, which has a handle, which has a spout to facilitate pouring of tea steeped within the container apparatus, and which is optionally pre-marked to show the user the level to which the container should be filled with water, a lid sized to fit releasably on the top-opening of the container, which is made of ceramic, porcelain, glass, metals or heat-resistant plastics, which can withstand contact with water having a temperature of at least 100° C. without releasing components or odors of the materials into the water, and which has a downward protruding bottom adapted to extend below the surface of water contained within the container, and a dish which has a diameter greater than the outer diameter of the container, which dish is adapted for the container to rest on and to catch any overflowing water when the lid is placed on the top-opening of the container;

wherein when intact or fragments of dried tea leaves and water are placed into the container and the lid is placed on the top-opening of the container, the lid is adapted such that the downward protruding bottom extends below the surface of the water and there is no significant contact between the water and atmospheric air and there is no significant amount of air trapped under the lid in contact with the water, (b) filling the container with water having a temperature of between about 70° C.–100° C. so that the water level is at least at or near the top-opening or up to a pre-marked position on the container;

(c) immediately placing the lid onto the top-opening of the container so that there is no significant contact between the water and atmospheric air and there is no significant amount of air trapped under the lid in contact with the water;

(d) allowing the tea leaves to be extracted in the water for at least about 10 minutes or until the water temperature cools to a safely drinkable temperature; and (e) optionally, pouring the liquid of step (d) onto ice and storing in an air-tight container in temperatures below about 37° C. for consumption within about 24 hours.

19. The method of claim 18, wherein the tea leaves contain green tea leaves.

20. A method of brewing intact or fragments of dried tea leaves under generally anaerobic conditions, comprising the steps of:

(a) placing a quantity of intact or fragments of dried tea leaves into a container apparatus which comprises a container which is made of inert materials that can withstand contact with water having a temperature of at least 100° C. without releasing components or odors of the materials into the water, which container is formed in such a way that when the tea leaves and water are placed therein there is no significant contact between the water and atmospheric air and there is no significant amount of air trapped within the container in contact with the water, an air outlet, a tea leaves inlet, a water inlet, a tea extract outlet, and an optional closable opening for cleaning the container;

(b) placing intact or fragments of dried tea leaves in the tea leaves inlet, (c) filling the container with water through the water inlet, which water has a temperature of between about 70° C.–100° C.;

(d) releasing any air present in the container through the air outlet;

(e) allowing the tea leaves to be extracted in the water for at least about 10 minutes;

(f) releasing tea extract through the tea extract outlet; and (g) optionally, pouring the tea extract onto ice and storing in an air-tight container in temperatures below about 37° C. for consumption within about 24 hours.

\* \* \* \* \*